United States Patent
Park et al.

(10) Patent No.: US 8,643,466 B2
(45) Date of Patent: Feb. 4, 2014

(54) METHOD AND SYSTEM FOR SETTING SECURITY OF A PORTABLE TERMINAL

(75) Inventors: Chang Jun Park, Gumi-si (KR); Ju Yong Choi, Gumi-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 768 days.

(21) Appl. No.: 12/583,611

(22) Filed: Aug. 24, 2009

(65) Prior Publication Data

US 2010/0066486 A1 Mar. 18, 2010

(30) Foreign Application Priority Data

Sep. 12, 2008 (KR) .................. 10-2008-0090217

(51) Int. Cl.
*G06K 19/06* (2006.01)
*G05B 19/00* (2006.01)
*G06F 7/00* (2006.01)
*H04B 1/00* (2006.01)

(52) U.S. Cl.
USPC ...................... 340/5.64; 340/5.61; 340/5.7

(58) Field of Classification Search
CPC .......... G06F 7/04; G06K 19/06; H04N 5/228
USPC ............... 340/5.64, 5.61, 5.7; 455/41.1, 558, 455/66.1, 569.2, 456.1; 348/222.1, 231.3, 348/552; 705/39, 26, 21; 235/492, 379, 375
See application file for complete search history.

(56) References Cited

U.S. PATENT DOCUMENTS

| | | | | |
|---|---|---|---|---|
| 6,892,052 | B2 * | 5/2005 | Kotola et al. | 455/41.2 |
| 6,973,333 | B1 * | 12/2005 | O'Neil | 455/569.2 |
| 7,012,503 | B2 * | 3/2006 | Nielsen | 340/5.6 |
| 7,374,100 | B2 * | 5/2008 | Jei et al. | 235/492 |
| 7,571,863 | B2 * | 8/2009 | Lauper | 235/492 |
| 7,580,885 | B2 * | 8/2009 | Kanno et al. | 705/39 |
| 7,650,630 | B2 * | 1/2010 | Yamada et al. | 726/4 |
| 7,903,147 | B2 * | 3/2011 | Lee et al. | 348/222.1 |
| 8,089,341 | B2 * | 1/2012 | Nakagawa et al. | 340/5.7 |
| 8,423,784 | B2 * | 4/2013 | Akama | 713/186 |
| 2002/0103009 | A1 * | 8/2002 | Sato | 455/558 |
| 2009/0075592 | A1 * | 3/2009 | Nystrom et al. | 455/41.1 |

FOREIGN PATENT DOCUMENTS

| | | | | |
|---|---|---|---|---|
| JP | 2006-191274 | 7/2006 | ............ | H04Q 7/38 |
| KR | 2006-68867 | 6/2006 | ............ | H04B 1/40 |

* cited by examiner

*Primary Examiner* — Nam V Nguyen
(74) *Attorney, Agent, or Firm* — Cha & Reiter, LLC

(57) ABSTRACT

The present invention relates to a method and system for setting security of a portable terminal by utilizing an RFID (Radio Frequency Identification) function of a USIM (Universal Subscriber Identity Module) card used in Third Generation portable terminals. For this, USIM card information is registered in an access control server, and the USIM card information of the portable terminal is sensed through a RFID reader installed at a point of entry of a secure area, and the security setting of the portable terminal is automatically performed according to the registration of USIM card information in the access control server.

20 Claims, 4 Drawing Sheets

METHOD AND SYSTEM FOR SETTING SECURITY OF A PORTABLE TERMINAL

CLAIM OF PRIORITY

This application claims the benefit of the earlier filing date, under 35 U.S.C. §119(a), to that Korean patent application filed in the Korean Intellectual Property Office on Sep. 12, 2008 and assigned Serial No. 10-2008-0090217, and the entire disclosure of which is hereby incorporated by reference.

BACKGROUND OF THE INVENTION

1. Field of the Invention

The present invention relates to portable terminal security, and more particularly, to a method and system for providing security within a portable terminal.

2. Description of the Related Art

As mobile communications technology has developed, the concern of a security method for the technology outflow prevention has increased both for individuals and for companies. More specifically, as the portable terminal provides various useful functions, the concern of a technology outflow prevention method by using a portable terminal has been increased. That is because a malicious user can drain information including confidential documents of company, and the design of product, from company data bases using the photographing function of the portable terminal which can conveniently photograph and the data storing function through the built in or the external memory of the portable terminal. Although the photographing function and data storing function of the portable terminal provides convenience to a general use these features can be used as a means to extract or withdraw information that is of importance and maintained as a secret of a company or a research institute.

As a representative security method to prevent unauthorized withdrawal of company information, a security tape is adhered to a camera lens when entering a secure area (hereinafter, security spot) so as to prohibit the photographing by the camera of portable terminal. However, such method has a disadvantage in that a security agent must attach the security tape to the camera lens one by one upon entry to the area. In another security method, the security program is set up in the portable terminal to restrict some functions (for example, the camera photographing) of the portable terminal. However, such method also has a disadvantage in that the user or the security agent must connect the security device, such as PC, to the portable terminal through a data cable to execute the security program.

In the meantime, the security spot can limit the entrance and exit. In other words, the entrance and exit authentication should be required through a security card which is permitted to enter and exit, an ID card and the fingerprint recognition can also be used to enter and leave the security spot. Accordingly, it is disadvantageous in that the user for entering or leaving the security spot should perform the security setting of the portable terminal. Particularly, in case there are many users entering or leaving the security spot, the incoming and outgoing latency time of users increases significantly.

SUMMARY OF THE INVENTION

The present invention has been made in view of the above problems, and provides a method and system for security of a portable terminal which automatically performs the access control and the security setting of portable terminal which restricts some functions of the portable terminal by utilizing the USIM (Universal Subscriber Identity Module) card of portable terminal having the RFID function.

In accordance with an aspect of the present invention, a system for setting security of a portable terminal includes: an access control server that stores USIM (Universal Subscriber Identity Module) card information of said portable terminal; a RFID (Radio Frequency Identification) reader that senses said USIM card information included in the portable terminal, and requests confirmation of registration of the USIM card information to the access control server, and transmits a security setting signal to the portable terminal in case the USIM card information is registered; and a portable terminal that includes a USIM card having an RFID function, wherein some functions in said portable terminal are restricted when receiving the security setting signal.

In accordance with another aspect of the present invention, a method for setting security of a portable terminal including a USIM (Universal Subscriber Identity Module) card having an RFID (Radio Frequency Identification) function includes: sensing said USIM card information by a RFID reader as the portable terminal approaches said RFID reader; requesting confirmation of registration of the sensed USIM card information to an access control server by the RFID reader; transmitting the registration of the USIM card information to the RFID reader by the access control server; transmitting a security setting signal to the portable terminal by the RFID reader in case the USIM card information is registered in the access control server; and establishing a security setting in such a manner that the portable terminal receiving the security setting signal is unable to use some functions.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the invention described in this specification and drawings are considered to be practical exemplary embodiments, it is to be understood that the invention is not limited to the disclosed embodiments, but, on the contrary, it should be clearly understood that many variations and modifications of the basic inventive concepts are obvious to those skilled in the present art and are considered to be within the scope of the invention claimed.

For the sake of convenience, the portable terminal according to an exemplary embodiment of the present invention will be illustrated as a mobile communications terminal, but it is not limitative. That is, the portable terminal according to an embodiment of the present invention is a terminal which includes an RFID function, and, preferably, can be applied to all kinds of information and telecommunication devices, multimedia devices and the applications, such as a mobile communications terminal, a mobile phone, a personal data assistant (PDA), a Smart phone, a IMT-2000 (International Mobile Telecommunication-2000) terminal, a UMTS (Universal Mobile Telecommunication Service) terminal and a digital broadcasting terminal.

Hereinafter, the USIM is a universal subscriber identity module utilized in third-generation mobile communication, and stores the Mobile Identification Number (hereinafter, MIN), and the International Mobile Station Equipment Identity (hereinafter, IMEI), and can include an RFID function. The USIM card can provide the function of a transportation card, a credit card or the like, by using the RFID function. RFID (Radio Frequency Identification) is a technology capable of exchanging and processing information on a real time basis by sensing a transmission of a unique frequency from an electronic tag comprised of a microelectronic chip and an antenna that is attached to an item.

Figure 1:
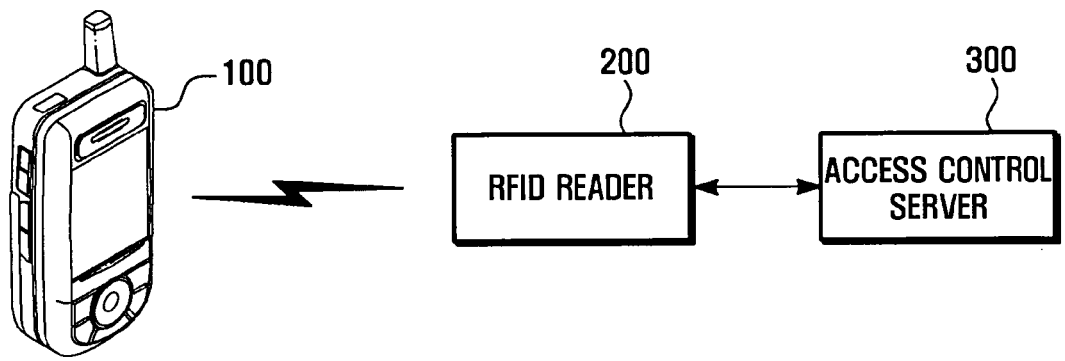
FIG. 1 is a block diagram schematically illustrating a security setting system for a portable terminal according to an embodiment of the present invention.

FIG. 1 is a block diagram schematically illustrating a security setting system of a portable terminal according to an exemplary embodiment of the present invention.

Referring to FIG. 1, the security setting system of the portable terminal according to the embodiment of the present invention includes a portable terminal 100, a RFID reader 200, and an access control server 300.

A user registers USIM card information, which is used in user's portable terminal 100, into the access control server 300. The USIM card information can include at least one of the MIN and the IMEI as information for confirming the user of the portable terminal 100. Moreover, the USIM card information can include personal certification information such as a qualified certificate stored in a memory area of the USIM card that may be used in a financial transaction, for example.

The user may approach the RFID reader 200 installed at the entrance with the portable terminal 100 so as to enter an area where one or more functions of the portable terminal 100 are to be restricted. That is, the area is a place where certain security limitations are required. The RFID reader 200 supplies the power to the USIM card of the portable terminal 100 through electromagnetic induction, and the USIM card provided with the power can transmit USIM card information to the RFID reader 200. The RFID reader 200 receiving the USIM card information transmits this information to the access control server 300, and the access control server 300 receiving this can confirm the registration of the USIM card information. At this time, the access control server 300 stores the time of reception of the USIM card information such that it can perform and record the access control of the user corresponding to the USIM card information. In case it is determined that the USIM card is not registered after receiving the USIM card information, the RFID reader 200 does not open a gate, and can transmit a warning message. For example, a voice message such as "You are an unregistered user. Entry denied".

In the meantime, in case of the USIM information is registered, the RFID reader 200 can transmit a security setting signal to the portable terminal 100 so as to restrict some functions of the portable terminal 100. The security setting signal includes the security level information of user. Accordingly, the function(s) which is restricted according to the security level of the user of portable terminal 100 can be differently set. For this, the access control server 300 stores together with the security level of the user corresponding to the USIM card information when registering the USIM card information, and can transmit the security level when transmitting the registration of USIM card information to the RFID reader 200. The portable terminal 100 receiving the security setting signal can disable some functions of the portable terminal 100. For example, the photograph shooting and the moving picture filming (hereinafter, camera photographing) function, the mobile disk function which stores data, the recording function, and the file transmission function using a local area wireless communication, may be disabled by operating the security program. The RFID reader 200 can allow entry (open a gate) to the security area after transmitting the security setting signal. However, the present invention is not limited to the fact that the gate is opened after transmitting the security setting signal. That is, the RFID reader 200 can open the gate after transmitting the security setting signal to the portable terminal 100, and receiving a security setting complete signal which indicates that the security setting has been successfully completed within the portable terminal 100. The detailed description of this operation will be described later.

In the meantime, in case the user approaches the RFID reader 200 installed at the exit of the security area with the portable terminal 100, the RFID reader 200 can transmit a security setting cancel signal to the portable terminal 100, and can open the gate, or the RFID reader 200 can open the gate after receiving the security setting cancel signal from the portable terminal 100 which informs the RFID reader 200 that the security setting cancellation is completed.

In the above, the security system for restricting some functions of the portable terminal 100 by using the USIM card of the portable terminal 100 when entering or exiting a place or area where security is required has been illustrated. Hereinafter, the portable terminal 100 among the elements of the security system according to an exemplary embodiment of the present invention will be illustrated in detail.

Figure 2:
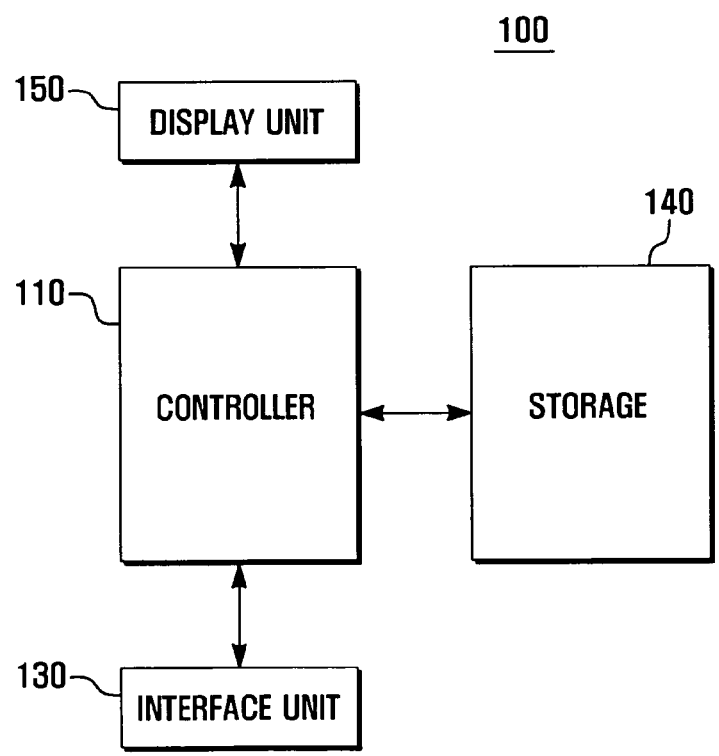
FIG. 2 is a block diagram schematically illustrating a configuration of a portable terminal according to an embodiment of the present invention.
Figure 3:
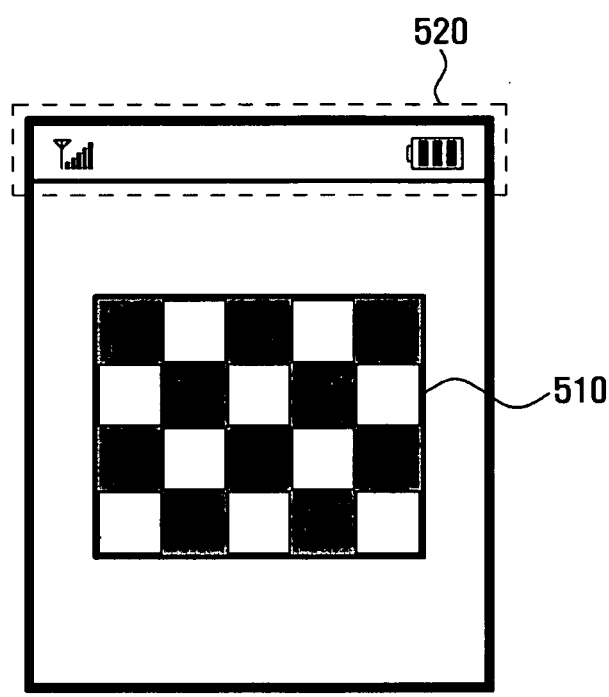
FIG. 3 is an example view of a security screen which notifies the security setting state of a portable terminal according to an embodiment of the present invention.

FIG. 2 is a block diagram schematically illustrating a configuration of portable terminal 100 according to an exemplary embodiment of the present invention. FIG. 3 is an example of a display which presents information regarding the portable terminal 100 according to an exemplary embodiment of the present invention wherein the portable terminal 100 is in a state of security setting.

Referring to FIG. 2 and FIG. 3, the portable terminal 100 according to an embodiment of the present invention includes a controller 110, a storage unit 140, a display unit 150 and an interface unit 130.

The interface unit 130 is an apparatus to which the USIM card (not shown) is inserted, and can provide the communication path between the USIM card and the controller 110. The USIM card refers to a universal subscriber identity module introduced into third-generation (3G) mobile communications terminals. The subscriber identity module is a module of card type used in the mobile communications terminal, and is an apparatus which stores personal information so as to provide various services such as the subscriber authentication, billing, and a security function. Particularly, the USIM card of the invention can store information including the MIN, the IMEI, and a qualified certificate which stores personal identification information. The MIN, the IMEI, and the qualified certificate information stored in the USIM card are registered in the access control server, and can be transmitted to the access control server through the RFID reader as the user approaches the RFID reader with the portable terminal 100. Thus, it can be confirmed whether the user is permitted to enter or exit a secure area, and further causes some functions of the portable terminal 100 to be restricted. Moreover, the USIM card can store the security program for restricting functions of the portable terminal 100. The security program can be stored in the memory area of the USIM card in the type of an applet. The security program is comprised of an Elementary File (hereinafter, EF), and the security setting state of the EF can be updated when receiving the security setting or security cancel signal from the RFID reader. That is, the security setting state of the EF can be set as "1" in case the security setting is performed, while the security setting state can be set as "0" in case the security setting is canceled. Alternatively, the security setting state of the EF can be set as "0" in case the security setting is set inversely, while the security setting state can be set as "1" in case the security setting is canceled.

The display unit 150 can display to a user data that the user inputted, function setting information or various information provided to the user as well as various menu screens of the portable terminal 100. Display unit 150 can be include with Liquid Crystal Display (hereinafter, LCD), and can include an input means in case the LCD is configured in the type of touch screen. Particularly, the display unit 150 according to an exemplary embodiment of the present invention can display an image which informs a user that the portable terminal 100 is in the security setting state. For example, an image as shown with regard to reference number 510 can be displayed in one side. Otherwise, a method of informing that an alarm and the manner mode are set, the display unit 150 can display an icon that informs the user that the security setting is set, as shown in indicator area 520. Moreover, the display unit 150 can display a pop-up window that informs the user that the menu is restricted under the control of the controller 110 when the user executes a security set menu.

The storage unit 140 can store user data as well as a program necessary for the function operation of the portable terminal 100. Storage 140 can include a program area and a data area.

The program area can store an Operating System (OS) that controls the overall operation of the portable terminal 100, and an application program necessary for the execution of multimedia contents, photograph shooting, data transmission, and digital broadcast reception and play.

The data area is an area in which data generated according to the execution one or more programs or functions of the portable terminal 100 is stored, can store a phone book, audio data, and information corresponding to a target contents or user data. Particularly, in case the security level of user is set, the data area according to an embodiment of the present invention can store a function restriction list as shown in Table 1 which defines those function that are to be restricted according to the security level.

TABLE 1

| security level | restricted function |
| --- | --- |
| 1 | photograph shooting, moving picture filming |
| 2 | photograph shooting, moving picture filming, mobile disk |
| 3 | photograph shooting, moving picture filming, mobile disk, recording function |
| 4 | photograph shooting, moving picture filming, mobile disk, Bluetooth, recording function, external memory |

Referring to Table 1, the function restriction list can be set differently according to the security level. For example, the portable terminal 100 of the user whose security level is "1" cannot use the photograph shooting, and the moving picture filming. The portable terminal 100 of the user whose security level is "2" cannot use the photograph shooting, the moving picture filming, and the mobile disk function. For this, the portable terminal 100 can receive the security level information when receiving the security setting signal.

In the meantime, Table 1 illustrates an example of function restriction list according to one aspect of the present invention, and does not limit the present invention. That is, the security level of the function restriction list and the restricted functions can be set according to the intention of designer. Moreover, the function restriction list can be stored in the memory area of the USIM card.

The controller 110 controls the overall operation of the portable terminal 100 and signal flows between inner blocks, and can control the data processing function. Particularly, the controller 110 can confirm whether the portable terminal 100 has a security setting when operating a specific menu. For this, the controller 110 can confirm the security setting state of the EF by forming a communications channel with the USIM card. For example, the controller 110 determines that security is set in case the security setting state of the EF is "1", while determining that the security setting is canceled in case the value indicating the security setting state of the EF is "0".

In case the security is set, the controller 110 can confirm whether the executed menu is included in the security set menu; that is, the already stored function restriction list. In case the executed menu is included in the function restriction list, the controller 110 can inform the user that the menu cannot be executed, through display unit 150 or an audio processing unit (not shown). That is, in case the user executes the camera photographing function, the mobile disk function of storing data, the recording function, or the file transmission function using local area wireless communications when the security setting is established on the portable terminal 100, the controller 110 controls those functions not to be executed, and can inform the user that the usage of the menu is restricted, through a speaker (not shown) or the display unit 150. For example, the controller 110 controls the display unit 150 to display a pop-up window that informs the user that the usage of the menu is restricted. Alternatively, an audio alarm may be issued.

The controller 110 can cause one or more preset specific application programs to be disabled when the security setting signal is inputted. In such case, the controller 110 does not need to confirm the security setting of the portable terminal 100 since the menu was set in an execution disabled mode when the security setting signal is inputted.

Moreover, although not shown, the portable terminal 100 can selectively include elements having additional functions such as a camera module for photograph shooting or moving picture filming, a wireless local communications module for the local area wireless communication, a connection terminal for data interchanging with an outside digital device, a charging terminal, and a digital sound playing module like a MP3 module, which may not be operatable when the security setting is established. The deactivation of such functions is so various according to the convergence of the digital device that it cannot be enumerated in detail. However, it is obvious to a person skilled in the art that an function equivalent to the above mentioned functions can be further included in the portable terminal 100.

In the above, the security setting system of the portable terminal according to the present invention was illustrated.

Hereinafter, the security setting process of the portable terminal according to the present invention is explained.

Figure 4:
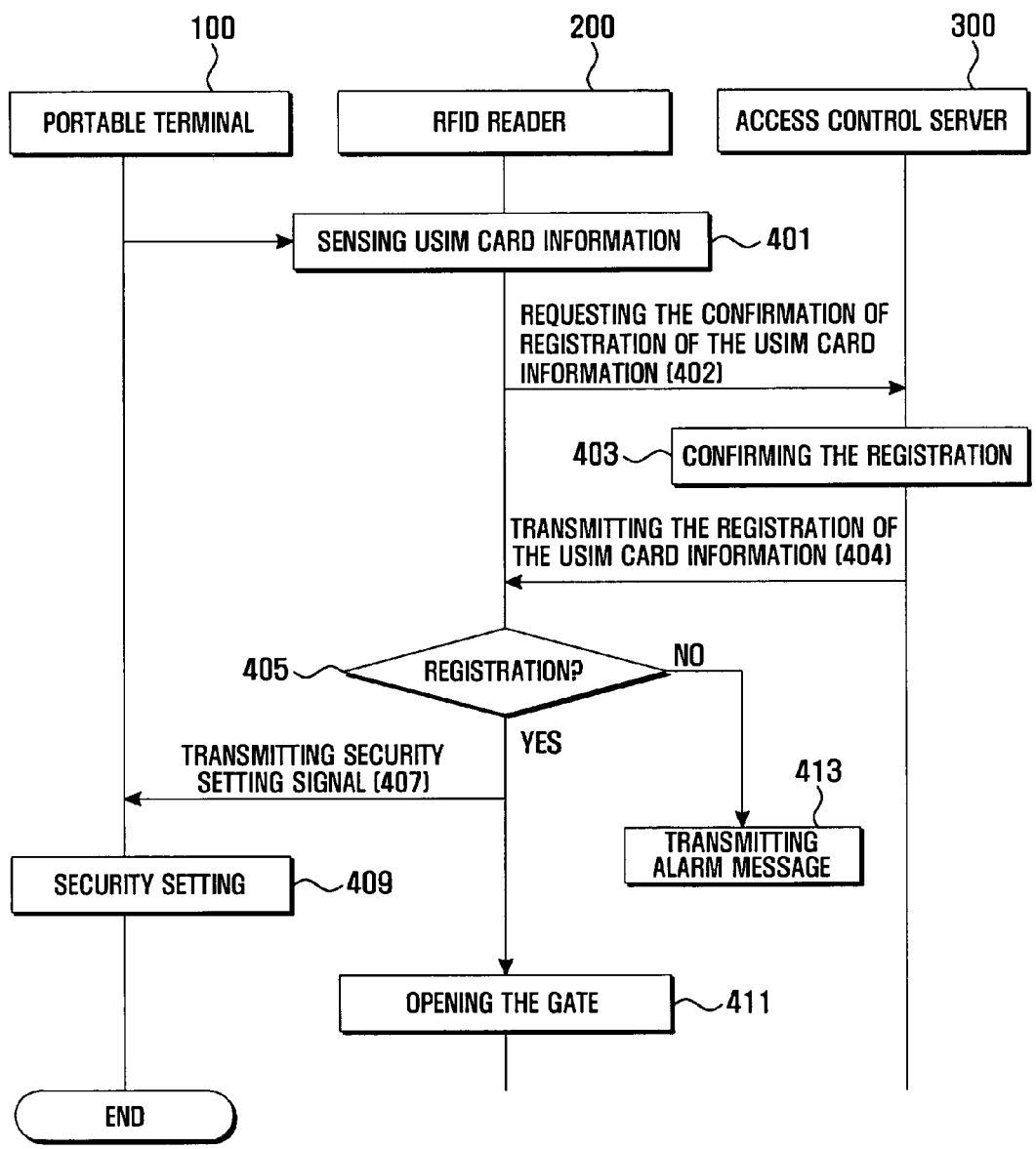
FIG. 4 is a flowchart illustrating a security setting process of a portable terminal according to an embodiment of the present invention.

FIG. 4 is a flowchart illustrating a security setting process of a portable terminal according to an exemplary embodiment of the present invention.

In the process shown in FIG. 4 it is assumed that user has registered the USIM card information of the portable terminal 100 into the access control server 300 in advance.

Referring to FIG. 4, if a user approaches an RFID reader 200 that is positioned within a given distance a security area, with portable terminal 100 to, the RFID reader 200 senses the USIM card information (401). Here, the USIM card information is the information for confirming the user of the portable terminal 100, and can include at least one of the MIN, the IMEI, and the qualified certificate. The RFID reader 200 transmits the USIM card information to the access control server 300 so as to confirm the registration of the sensed USIM card information, and can request the confirmation of registration of the USIM card information (402).

The access control server 300 receiving the USIM card information can confirm the registration of the USIM card information (403). Moreover, although not shown, in case of receiving registration confirmation request of the USIM card information, the access control server 300 can store the time of reception of the registration confirmation request, so that it can monitor the access control (for example, the management of time of entering or exiting an office, the management of holiday work time, etc.) of the user corresponding to the USIM card information.

The access control server 300 can then transmit the registration of the USIM card information to the RFID reader 200 (404). At this time, in case the security level is set according to user, the access control server 300 can transmit the security level information. The security level can be stored in the access control server 300 when registering the USIM card information.

In case the USIM card information is registered (405), the RFID reader 200 transmits the security setting signal to the portable terminal 100 (407), thereafter, the access to the secure area may be allowed (i.e., gate is opened) (411).

In the meantime, the portable terminal 100 receiving the security setting signal from the RFID reader 200 operates a security program (409), so that causes the restriction of the usage of one or more of functions within the portable terminal 100. For example, a camera photographing function, a mobile disk function of storing data, a recording function, and a file transmitting function using the local area wireless communication can be disabled from operating. At this time, in case the security level information is included in the security setting signal, the portable terminal 100 can perform the security setting according to the security level by confirming the usage restricted function with reference to a function restriction list, as describe previously.

On the other hand, in case the USIM card information is not registered at step 405, the RFID reader 200 can transmit an alarm message which informs that the card is not registered, for example, a voice message like "You are an unregistered user", or a visual alarm indicating that the user is not registered.

In the meantime, in the above, it was illustrated that the gate is opened according to the registration of the USIM card, but the present invention is not limitative. That is, the RFID reader 200 can open the gate after confirming whether the security setting of the portable terminal 100 is completed. In other words, the RFID reader 200 can open the gate when receiving a security setting complete signal from the portable terminal 100, while not opening the gate when not receiving the signal.

In the above, the security setting process was explained, which restricts some functions of the portable terminal by using the USIM card of the portable terminal 100 when entering or exiting a place where the security was requested. Hereinafter, a menu execution process of the portable terminal according to an exemplary embodiment of the present invention is explained.

Figure 5:
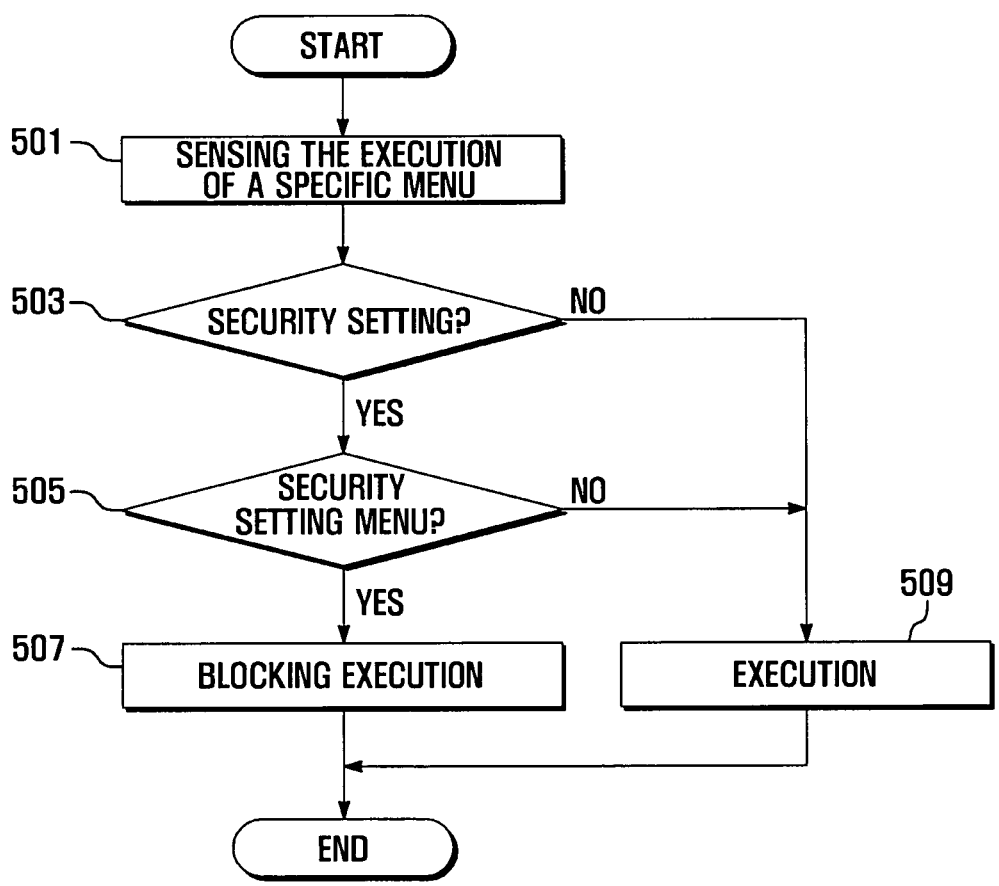
FIG. 5 is a flowchart illustrating a menu execution process of a portable terminal according to an exemplary embodiment of the present invention.

FIG. 5 is a flowchart illustrating a menu execution process of a portable terminal according to an exemplary embodiment of the present invention.

Referring to FIG. 5, the controller senses the execution of a specific menu (501). The controller can confirm whether the security setting is established (503). As a result of the confirmation that the security setting is established, the controller can confirm whether the executed menu is a security set menu (505). Here, in case the function which is restricted according to the security level is set differently, the controller can confirm whether it is a restricted function; i.e., a security set menu with reference to the stored function restriction list. Otherwise, the controller can initiate a communications channel with the USIM card, and can confirm whether it is a security set menu from the security program stored in the USIM card. As a result of the confirmation, in case the menu to which the execution is requested is a security setting menu at step 505, the controller can block the execution of the menu (507). On the other hand, in case the menu is not the security setting menu at step 505, the controller can operate the execution requested menu (509).

In the meantime, in case the security is not established in the portable terminal at step 503, the execution requested menu can be operated at step 509.

It has been illustrated that the controller confirms the security setting of the portable terminal in the execution of a specific menu, but the present invention is not limited to this specific embodiment. That is, the controller can set preset specific application programs to be disabled in the input of the security setting signal. In such case, the controller does not need to confirm the security setting of the portable terminal since the specific menus are set to be disabled in the input of the security setting signal.

As described above, the security setting method and system of the portable terminal according to the present invention can simultaneously perform the security setting which restricts some functions of the portable terminal and the access control when entering a secure area, so that it has an effect of improving the convenience to a user, and preventing the inappropriate withdrawal of company information through a portable terminal. Moreover, the present invention does not require an additional apparatus as using the USIM card is already included in the portable terminal.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for setting security of a portable terminal including a USIM (Universal Subscriber Identity Module) card having an RFID (Radio Frequency Identification) function, the method comprising:
    registering, in an access control server, USIM card information stored in the USIM card of the portable terminal, with the registration used to disable at least one function of the portable terminal, wherein the registered USIM card information uniquely identifies the portable terminal;
    sensing the USIM card information by a RFID reader when the portable terminal approaches the RFID reader;
    requesting confirmation of the prior registration of the sensed USIM card information to the access control server by the RFID reader;
    transmitting the confirmation of the prior registration of the USIM card information to the RFID reader by the access control server;
    transmitting a security setting signal to the portable terminal by the RFID reader when the USIM card information is determined to be previously registered in the access control server;
    establishing a security setting in such a manner that the portable terminal receiving the security setting signal is unable to execute the at least one function of the portable terminal; and
    responsive to the registration of the USIM card information, disabling the at least one function of the portable terminal.

2. The method of claim 1, further comprising:
    outputting an alarm message in case the USIM card information is not registered in the access control server.

3. The method of claim 1, further comprising:
    controlling the opening of an entrance gate according to the registration of the USIM card information.

4. The method of claim 3, wherein controlling the opening of the entrance gate comprises:
    confirming the security setting completion of the portable terminal;
    opening the entrance gate in case the security setting of the portable terminal is completed.

5. The method of claim 1, further comprising storing a time reception of the USIM card information by the access control server.

6. The method of claim 1, wherein the USIM card information includes at least one of: a telephone number, an apparatus serial number and a qualified certificate which stores personal certification information.

7. The method of claim 1, wherein transmitting a security setting signal to the portable terminal comprises:
    transmitting a user security level corresponding to the USIM card information; and
    restricting one or more functions of portable terminal according to the user security level.

8. The method of claim 1, wherein the at least one function includes at least one of a camera photographing function, a mobile disk function of storing data, a recording function, and a file transmission function using local area wireless communications.

9. A system of security setting of a portable terminal comprising:
    an access control server that receives, stores, and registers USIM (Universal Subscriber Identity Module) card information of a USIM card of the portable terminal with the registration used to disable at least one function of the portable terminal, wherein the registered USIM card information uniquely identifies the portable terminal;
    a RFID (Radio Frequency Identification) reader that senses the previously registered USIM card information included in the portable terminal, and requests confirmation, to the access control server, of the prior registration of the USIM card information in the access control server, and transmits a security setting signal to the portable terminal in case the USIM card information is previously registered; and
    wherein the portable terminal includes the USIM card having the previously registered USIM card information and having an RFID function, wherein, responsive to the registration, the at least one function operable on the portable terminal is disabled when receiving the security setting signal.

10. The system of claim 9, wherein the RFID reader transmits an alarm message in case the sensed USIM card information is not registered.

11. The system of claim 10, wherein the RFID reader controls the opening of an entrance gate according to the registration of the USIM card information.

12. The system of claim 11, wherein the RFID reader confirms whether the security setting of the portable terminal is completed and opens the entrance gate when the security setting is completed.

13. The system of claim 9, wherein the USIM card information includes at least one of: a telephone number, an apparatus serial number and a qualified certificate which stores personal certification information.

14. The system of claim 9, wherein the access control server further stores a time of reception of registration confirmation request of the USIM card information.

15. The system of claim 9, wherein the access control server further stores a user security level corresponding to the USIM card information.

16. The system of claim 15, wherein the portable terminal comprises:
    an interface unit to which the USIM card is inserted;
    a controller that restricts some preset functions when receiving a security setting signal;
    a display unit that outputs an image which notifies a user of a security setting state, and outputs a pop-up window which provides information that a function menu is restricted after execution of security setting menu is requested; and
    a storage unit that stores a function restriction list which establishes at least one function that is restricted according to the security level of the user.

17. The system of claim 9, wherein the at least one functions include at least one of: a camera photographing function, a mobile disk function of storing data, a recording function, and a file transmission function using local area wireless communications.

18. A portable terminal comprising:
    a USIM (Universal Subscriber Identity Module) card including a Radio Frequency Identification (RFID) function and stored USIM card information previously registered in an access control server, with the registration used to disable at least one function of the portable terminal, wherein the USIM card information uniquely identifies the portable terminal;

a processor in communication with a memory, the memory including code which, when accessed by the processor, causes the processor to:

receive a security setting signal sent by an RFID reader after confirmation by the access control server of the prior registration, in the access control server, of the USIM card information;

execute a security program stored in said memory, wherein said security program prevents execution of at least one executable function within said portable terminal; and use the registration of the USIM card information to disable the at least one function of the portable terminal.

19. The portable terminal of claim 18 wherein said security setting signal includes a user security level.

20. The portable terminal of claim 19, wherein said memory includes a function restriction list which represents which of said functions are restricted based on said user security level.

* * * * *